United States Patent [19]
Kim

[11] Patent Number: 5,997,824
[45] Date of Patent: Dec. 7, 1999

[54] GAS SCRUBBER AND METHODS OF DISPOSING A GAS USING THE SAME

[75] Inventor: Dong Soo Kim, Inchon, Rep. of Korea

[73] Assignee: Korea M.A.T. Co., Ltd., Chung-Nam, Rep. of Korea

[21] Appl. No.: 09/014,521

[22] Filed: Jan. 28, 1998

[30] Foreign Application Priority Data

Mar. 21, 1997 [KR] Rep. of Korea ...................... P97-9741
Mar. 21, 1997 [KR] Rep. of Korea ...................... P97-9742
Mar. 21, 1997 [KR] Rep. of Korea ...................... P97-9744
Mar. 21, 1997 [KR] Rep. of Korea ...................... P97-9745

[51] Int. Cl.$^6$ .................................................. B01D 53/34
[52] U.S. Cl. .......................... 422/171; 422/168; 422/173; 422/198; 422/212
[58] Field of Search .................................. 422/168, 171, 422/173, 178, 190, 212, 198; 423/210, 240 S, 245.3, 215.5; 588/205, 900

[56] References Cited

U.S. PATENT DOCUMENTS 5,759,498  6/1998  Sheu et al. .............................. 422/168
5,800,792  9/1998  Ibaraki et al. .......................... 422/173

*Primary Examiner*—Hien Tran
*Attorney, Agent, or Firm*—McCormick, Paulding & Huber, LLP

[57] ABSTRACT

This invention relates to a gas scrubber and methods of disposing a gas by using same. The gas produced during the manufacturing of the semiconductor is supplied to a burner through a gas intake tube. Initial purification process occurs when flammable and harmful components of the gas are burned in the burner. The gas initially is treated in the burner and then flows into the adsorbent device. A multiple layers of catalytic adsorbent materials are placed in an adsorbent device to physically and chemically treat the gas. The gas is distributed in order from the bottom the catalytic adsorbent materials to the top level. Depending upon a pressure difference between the supplied gas and discharged gas, or the density of harmful components within the discharged gas, the gas is distributed to pass through next catalytic adsorbent materials.

22 Claims, 10 Drawing Sheets

GAS SCRUBBER AND METHODS OF DISPOSING A GAS USING THE SAME

TECHNICAL FIELDS

This invention relates to a gas scrubber and methods of disposing a gas using the same, particularly to a gas scrubber and methods of disposing harmful components of gases and a mixture thereof which are generated during the manufacturing of a semiconductor device, through a process of sequence of burning, cooling and adsorbing the gases and the mixture, using the scrubber.

BACKGROUND

Generally, for manufacturing of semiconductor device, the gases leaving harmful, flammable, corrosive properties are used. For example, in process for manufacturing the semiconductor device such as Chemical Vapor Deposition (CVD), Low Pressure CVD, Plasma CVD, Plasma Corrosion, and Epitaxy CVD, gas materials such as $SiH_4$, $SiH_2Cl_2$, $4NH_3$, NO, $AsH_3$, $PH_3$, $B_2H_6$ are a little utilized. Also, a gas exhausted from the device, which carries out the processes, contains a high degree of the toxic components such as harmful, flammable, corrosive properties. Therefore, in order to prevent environmental pollution due to a leakage of the gas materials to atmosphere, it is generally regulated to purify the exhaust gas by the law, before the exhaust gas is exhausted to atmosphere.

There are three methods to dispose the toxic gases produced during manufacturing of the semiconductor device: First method is disposing of flammable toxic components contained in the exhaust gas, which are generally composed of hydrogen gas, by burning the flammable components at high temperature of 500° C. or 800° C. in a burning chamber. Second method is disposing a water-soluble toxic components contained in the exhaust gas by using the wetting method in which the water-soluble toxic components are decomposed while they pass through water stored in the bath. Final method is to remove from the exhaust gas by adsorbing the toxic components contained in the exhaust gas, which cannot be burned or melted, using adsorbents, in which the toxic components are decomposed physically and chemically when they are passing through the adsorbents.

When the burning method is used for disposing the toxic components contained in the exhaust gas, silane contained in the exhaust gas may be burned with oxygen in air, so that Silicon Dioxide is created. Unfortunately such Silicon Dioxide causes following problems: First, the Silicon Dioxide particle could be formed as a result of a gas phase reaction which could clog up gas passages in the burner and in some instances it could cause some troubles in the burning system. Secondly, the Silicon Dioxide is generally collected through a washing process and then water used in the washing process must be treated to completely remove any remaining of chemical particles or other contaminated materials before disposal.

On the other hand, the wetting method has two ways, one being a wet chemical solution which is used to dispose the toxic components contained in the exhaust gas that are water soluble, and the other being a dry chemical solution which is used to dispose them that are non-water soluble material could be dissolved chemically.

However, even tough wetting method is effective in treating the gas produced during the manufacturing of the semiconductor device, it has been less preferred because of the used water or the chemical solution must be cleaned before discharged from a factory corresponding to tendency of gradually strengthen a water pollution regulation worldwidely.

Also, the adsorbent method has a problem that the adsorbent must be frequently replaced with new adsorbent because gas passages provided in the agglutinated particles of the adsorbent are clogged with the adsorbed toxic components when the gas is treated by the adsorbent. This causes decrease in the gas flowing rate of the gas that passes through the adsorbent particles.

To overcome the problems set forth above, Delatech Inc, Napa, Calif., U.S., developed CDO™ system, as illustrated in FIG. 1, that uses burning method, wetting method, and adsorbent method to dispose the gases that was generated during the manufacturing of the semiconductor device. Followings are the description of how system works.

If the exhaust gas such as gas and/or vapor is entered into the oxidation section 202 of the CDO™ system in which an air ($O_2$) is injected in about pressure of 60 psi into by an air supply nozzle 209, therefore the gas and/or the vapor is mixed with pressured air in the oxidation section 202. Then, mixture of processed exhaust gas and the pressured air flows into the thermal reaction section 203 where thermal/oxidation reaction occurs. In the thermal reactron section 203, the mixtures of the gas and pressured air are heated at the temperature of 650° C. or 900° C. by the cylinder shape of the heater elements 208, in which is provided inconel tubes 210 that was formed by casting an alloy consisting of Fe, Ni, and Cr.

To prevent the mixture of the processed exhaust gas/air from being ignited by heating, $N_2$ gas is injected at the pressure of 2psi into top of the thermal reaction section 203 when the temperature therein reaches 650° C. by the heater elements 208.

For example, in the thermal reaction section 203, the components such gases as $SiH_4$, $SiH_2Cl_2$, $4NH_3$, $AsH_3$, $PH_3$, $B_2H_6$, and $WF_6$ contained in the exhaust gas are purified through following heat reactions:

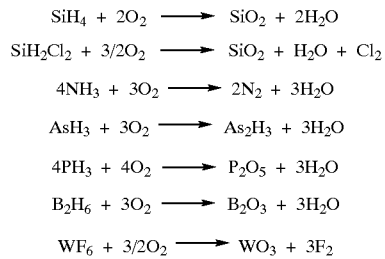

$$SiH_4 + 2O_2 \longrightarrow SiO_2 + 2H_2O$$
$$SiH_2Cl_2 + 3/2O_2 \longrightarrow SiO_2 + H_2O + Cl_2$$
$$4NH_3 + 3O_2 \longrightarrow 2N_2 + 3H_2O$$
$$AsH_3 + 3O_2 \longrightarrow As_2H_3 + 3H_2O$$
$$4PH_3 + 4O_2 \longrightarrow P_2O_5 + 3H_2O$$
$$B_2H_6 + 3O_2 \longrightarrow B_2O_3 + 3H_2O$$
$$WF_6 + 3/2O_2 \longrightarrow WO_3 + 3F_2$$

The oxidation nozzle assembly provided in the thermal reaction section 203 is designed to mix the pressured air injected from the air supply nozzle 209 located at the entrance of the thermal reaction section 203 with the exhaust gas. This design controls the location where terminal reaction begins, reduce and/or eliminate particles buildup the air supply nozzle 209, and increase the life of the air supply nozzle 209. The controlled oxygen surrounding is kept at high temperature and enhances heat reaction while it creates effective reactionary mixture. These features enhance the possibility that flammable and toxic gas and vapor will be completely reacted in a contained, controlled manner.

The thermal reaction section 203 as above described is made up of high temperature heater elements 208 isolated from the reactive gas mixture by the inconel tubes 210. The heater elements 208 are a thermocouple that is being controlled to maintain minimum temperature of the thermal reaction section 203.

The reacted gas as above described is then flows into first and second cooling and scrubbing sections 204, 205 by water injected from the water spray nozzles 206, 207, respectively. In the first cooling and scrubbing section 204, the particles, water-soluble components and vapor are removed from the exhaust gas while the gas is cooled at a low temperature, and mixed with water to dissolve water-soluble element. Remaining non-water-soluble toxic components of the exhaust gas are eliminated by the adsorbent 211 provided in the second cooling and scrubbing sections 205 while passing through the second cooling and scrubbing sections 205.

The water, which contains the water-soluble and the adsorbed components, is drained through the drain hole 212 that is located at the bottom of the second cooling and scrubbing section, 205. The drain flow sensor 213 attached at the drain hole 212, senses a water level when it reaches a certain point due to a blockage of the drain hole 212 caused by the water mixture, then closes the water spray nozzle 206, 207 by opening an electric circuit.

However, in CDO™ system, because moisture is existed in a boundary between the thermal reaction section 203 and the first cooling and scrubbing section 204, and the particles from the thermal reaction section 203 are mixed with this moisture, then a particle agglomeration is formed therein. This particle agglomeration becomes a blockage of passages in the boundary between the thermal reaction section 203 and the first cooling and scrubbing section 204, which interfere with the gas flow from the thermal reaction section 203 to the first cooling and scrubbing section 204. This will cause a breakdown of the system and as a result shorten the life span of the system.

Moreover, the cost of the system is expensive due to the complexity of the system since it removes the harmful components of the gas by injecting a prescribed pressure of nitrogen, air, and water.

Another inherent problem of above mentioned system is that since the system uses the wetting method, there is a problem of treating water which containing toxic and flammable components, and the chemical adsorbents before releasing from the factory.

Accordingly, an object of present invention is to provided a gas scrubber which can effectively dispose the harmful gas generated during the manufacturing of the semiconductor device as well as is relatively inexpensive gas scrubber since a construction of the system and methods of disposing the gas using the gas scrubber are much simpler.

Another object of the invention is to provide a gas scrubber which can remove clustered harmful particles in much simpler manner and prevent the breakdown of the system due to harmful particles beforehand, thus can be increased the life span of the system, and the methods of disposing the gas using the scrubber.

Further object of the invention is to provide the gas scrubber which can utilize an installation space by placing both burning and adsorption equipment in one case, thus make it compact and light weight, and method of disposing the gas using the scrubber.

SUMMARY OF THE INVENTION

The above mentioned objects are accomplished by a gas scrubber in accordance with an aspect of the present invention, which comprise a cabinet having a door hinged at one side thereof:

a gas intake tube being entered gas which is produced during the manufacturing of semiconductor device, and attached with a first pressure gauge for measuring pressure of the entered gas;

a burner for burning the gas supplied through the gas intake tube, the burner being located within the cabinet and connected with the gas intake tube;

an adsorption device for adsorbing components of the gas which have not been burned in the burner and physically and chemically treating the adsorbed components, a gas discharge tube for discharging the treated gas, the gas discharge tube being connected to the adsorption device through other connecting pipe and attached with a second pressure gauge for measuring pressure of the discharged gas.

means for detachably connecting the burner to the adsorption device or the gas discharge tube, selectively; and cooling means for cooling the gas heated using coolng water while the gas is moved from the burner to adsorption device, the cooling means being located around the burner and the connecting means.

Also, in accordance with an another aspect of the present invention, the above mentioned objects are accomplished by methods for disposing a gas produced during a manufacturing of the semiconductor device, which comprise the steps of:

inducing the gas to the burner through a gas intake tube, and burning flammable-toxic components of the gas by heating it in the burner to remove the components from the gas;

cooling the gas and absorbing non-flammable and harmful components of the gas while the gas is moved from the burner to adsorption device, and removing the components from the inner surface of the exhaust tube, the non-flammable and harmful components of the gas are not been burned by the burner, at the inner surface of the exhaust tube, passing multiple layers of catalytic adsorbent materials which are stacked in order from the bottom layer to the top layer, so that remaining non-flamnmable and harmful components are physically and chemically treated by the catalytic adsorption materials.

DESCRIPTION OF THE PREFERRED EMBODIMENT

Figure 1:
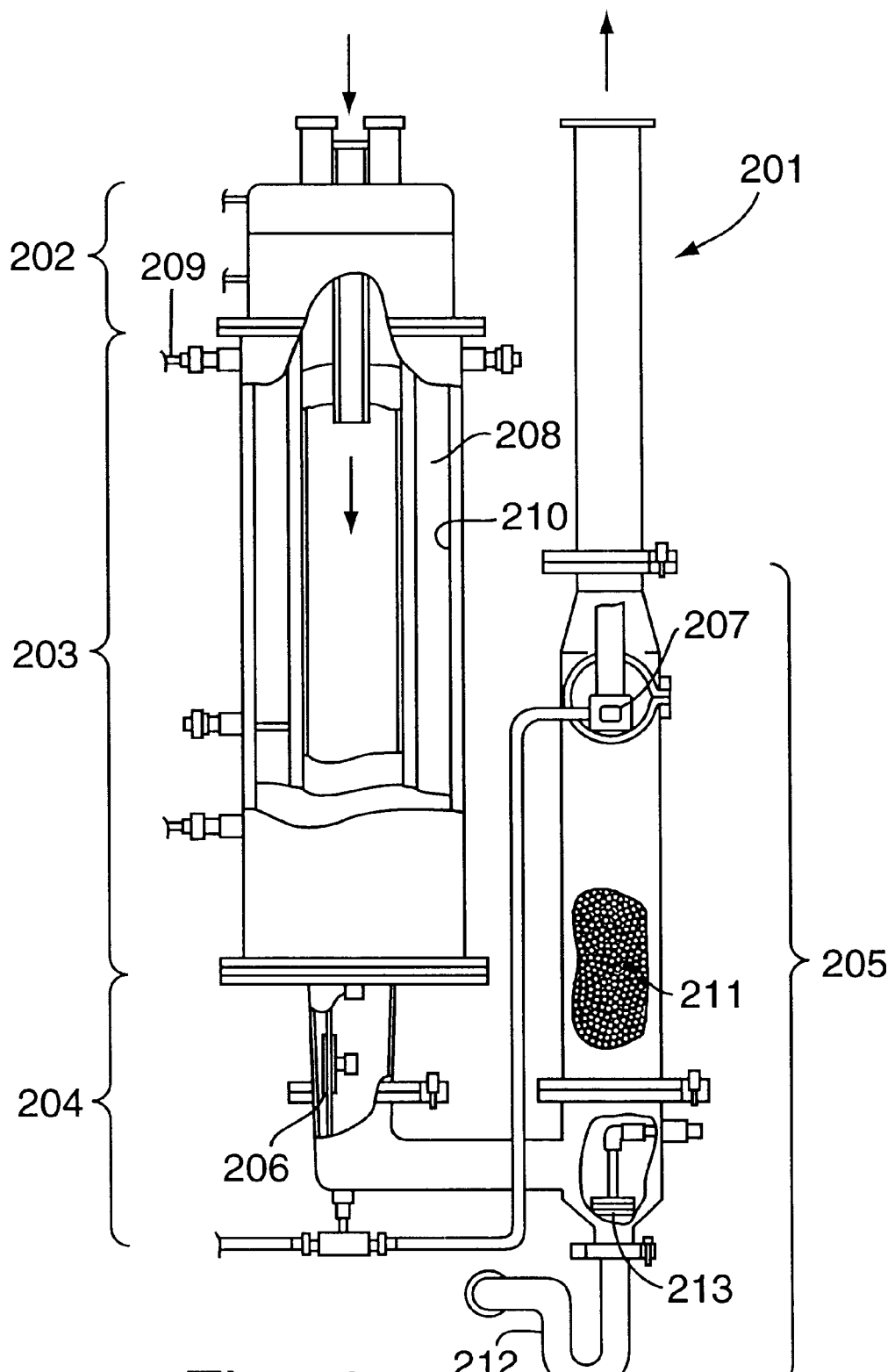
FIG. 1 is an illustration of the traditional gas scrubber for treating the gas produced during the manufacturing of the semiconductor device.
Figure 2:
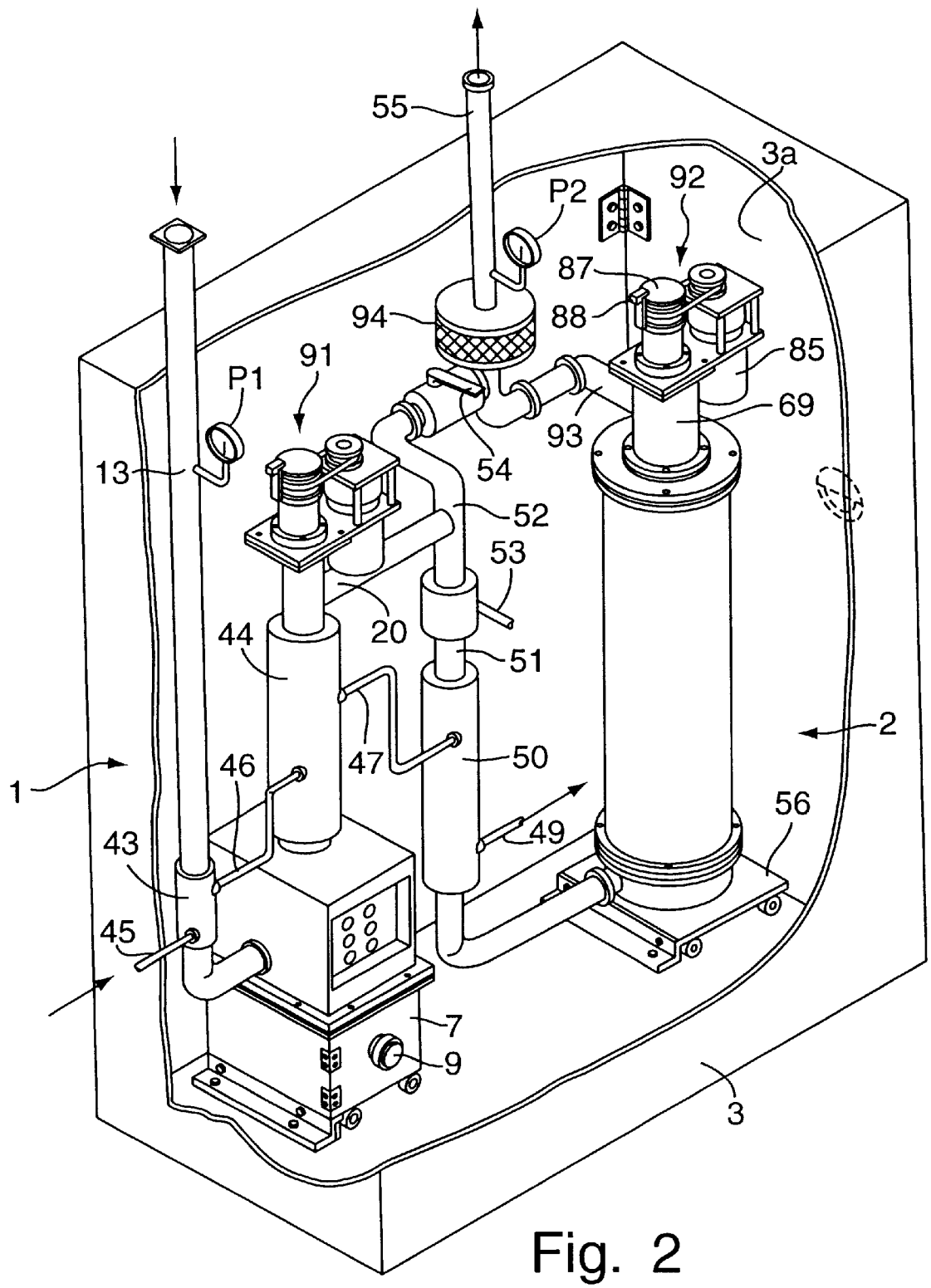
FIG. 2 is a perspective view of a gas scrubber in accordance with the invention.

Referring to FIG. 2, the gas scrubber in accordance with the present invention includes a cabinet 3 having a door hinged at one side, the cabinet 3 contains a burner 1 and an adsorbent device 2. The flammable components of the gas which was produced during the manufacturing of the semiconductor device is burned by burner 1, and the gas components which are not burned in the burner 1 are treated chemically and physically by the adsorbent device 2.

Figure 3:
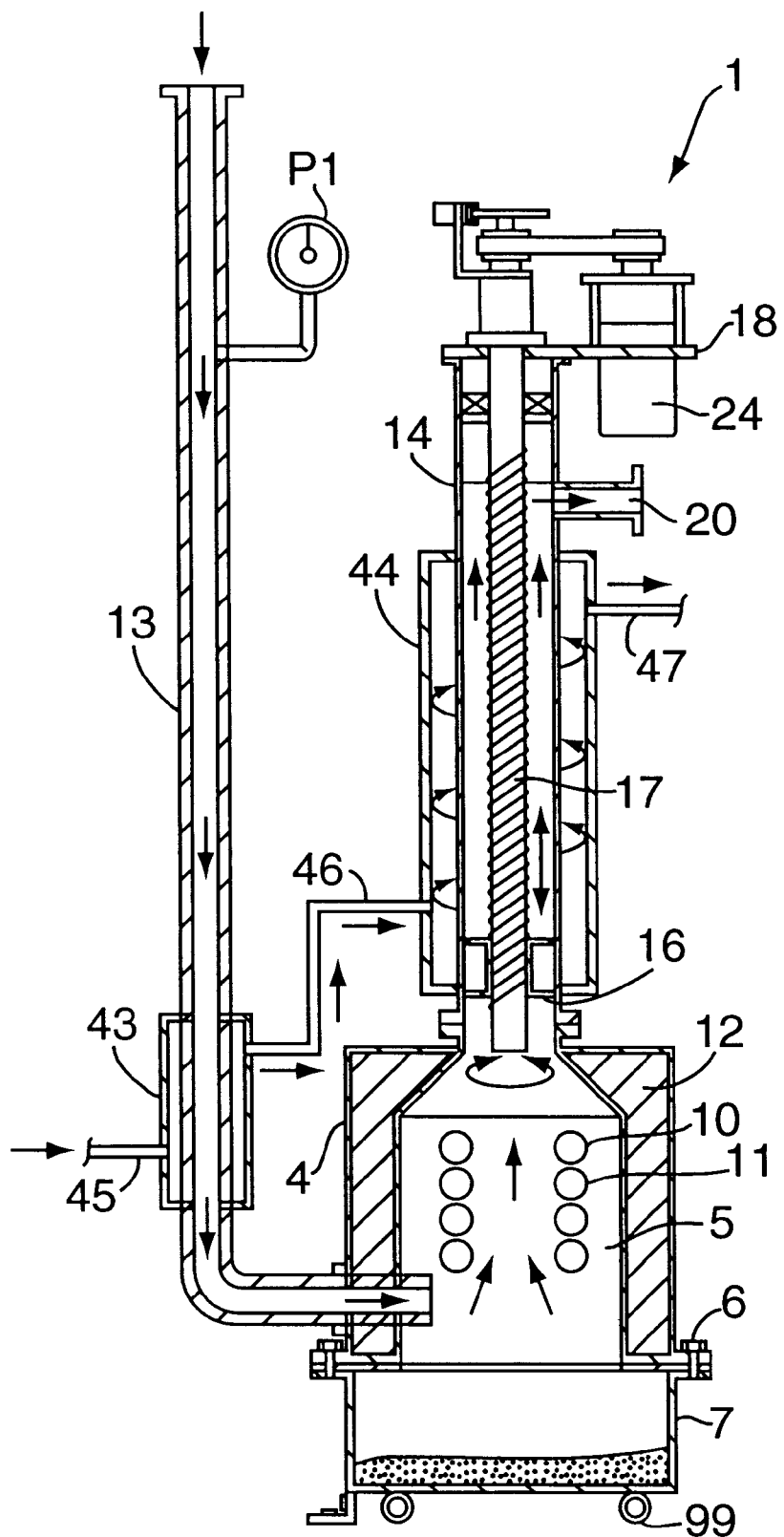
FIG. 3 is a fragmentary sectional view of the burner of the gas scrubber shown at FIG. 2.
Figure 4:
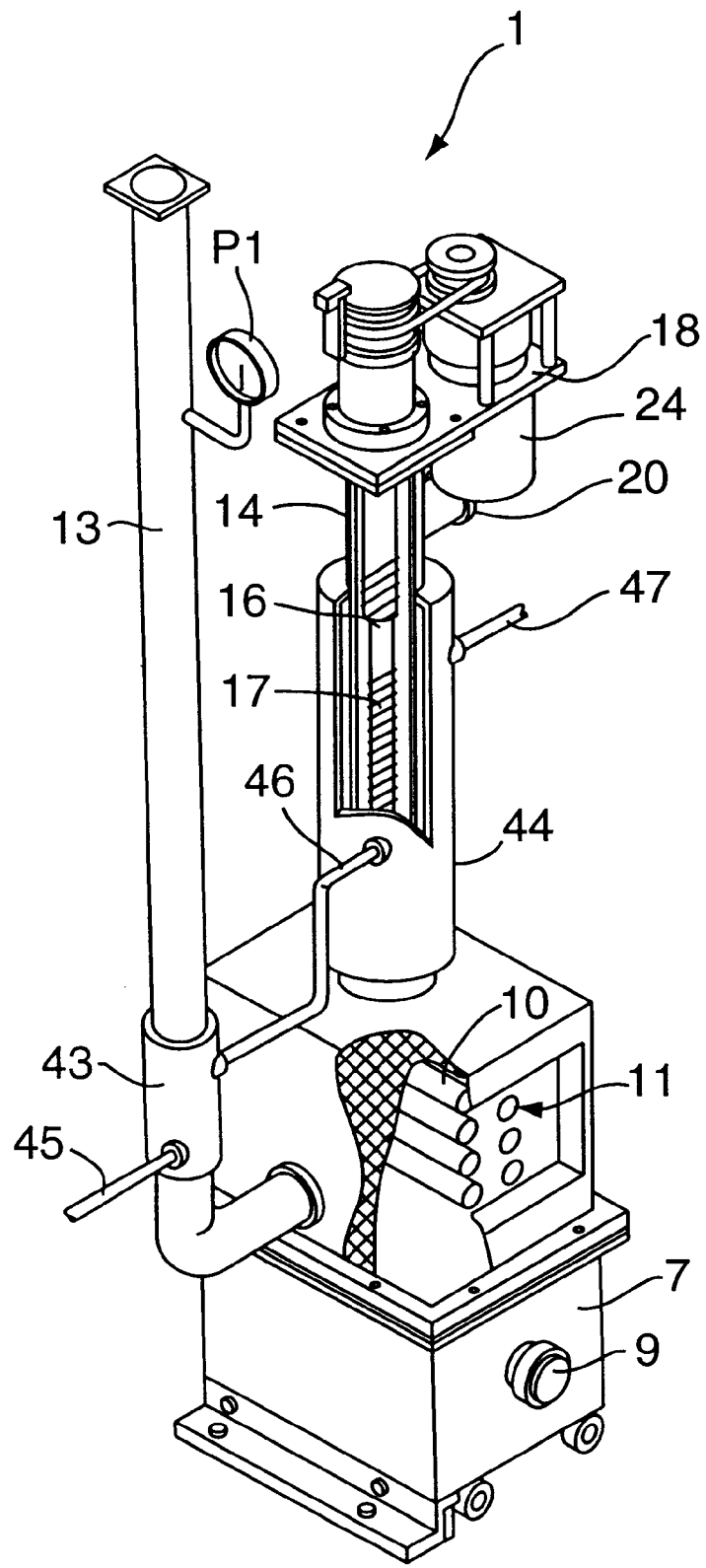
FIG. 4 is a sectional view of the burner shown at FIG. 3.

As illustrated in FIG. 3 and FIG. 4, the burner 1 has the burning case 4 in which the burning chamber 5 is provided, and the burning case 4 is connected with the gas intake tube 13 which induces to the gas scrubber from the manufacturing device of semiconductor. The gas intake tube 13 is connected with the burning chamber 5 passing through the burning case 4, thus the gas produced in manufacturing the semiconductor device is introduced through the gas intake tube 13 to the burning chamber 5 placed in inside of the burning case 4. At this point, the pressure gauge P1 measures the pressure of the gas supplied to the burning chamber 5 through the gas intake tube 13.

The ceramic heaters 11, which are placed inside of a plurality sets of inconel tubes 10 respectively, are positioned in a parallel manner in the burning chamber 5, whereby the gas supplied into the burning chamber 5 is heated by heating of the ceramic heaters 11 such that the flammable components of the gas are burned. As illustrated in FIG. 3, electricity is supplied to the ceramic heater 11 through wires (not shown) which are connected to the two projected ends of the ceramic heater 11 to generate a heat of 500° C. to 800° C. As above described, since each sets of the inconel tubes 10 is positioned in parallel manner inside of the burning chamber 5, a flammable components of the gas are burned while the gas is passing through the inconel tubes 10.

In order to prevent the heat generated by the ceramic heaters 11 from not emitting to outside of the burning case 4, an insulating material 12, such as a ceramic wool, is placed in between the burning case 4 and the burning chamber 5. Therefore, when the ceramic heaters 11 are operated to burn the flammable components of the gas, the inside temperature of the cabinet 3 which contains the burning case 4 is not raised.

To receive and store a sludge created when the flammable components of gas is burned in the burning chamber 5, a sludge storage container 7 is placed in lower portion of the burning chamber 5. The sludge storage container 7 is attached to the bottom of the burning chamber 5 with a fastener 6 such as a plurality of bolts. Therefore, the sludge created while burning a gas is dropped into the sludge storage container 7 and stored therein.

The sludge stored in the sludge storage container 7 can be removed through a door provided in one side of the sludge storage container 7. The proper time for removal can be decided based on the amount of the stored sludge ascertained through a window 9 that is attached to the door 8. Therefore, to be able to ascertain the amount of the stored sludge, the window 9 is made up of preferably transparent materials such as heat-resistant glass.

To discharge the gas that the flammable components are burned in the burning chamber 5, an exhaust tube 14 communicates with the burning chamber 5 is provided at the top of the burning case 4 and, The gas which has been treated in the burner 1 then flows to the adsorption device or a gas discharge tube 55 along the exhaust tube 14 which is coupled with the connecting tube 20. In the connecting tube 20, a first connecting pipe 51 connected to the gas discharge tube 55 and a second connecting pipe 52 connected to the adsorption device 2 are branched off, respectively. Therefore, the gas, which has been treated in the burning chamber 5, is dispensed through the exhaust tube 14 to either the connecting tube 20 or the adsorption device 2 by operation of two valves 53, 54 as described later.

Figure 5A:
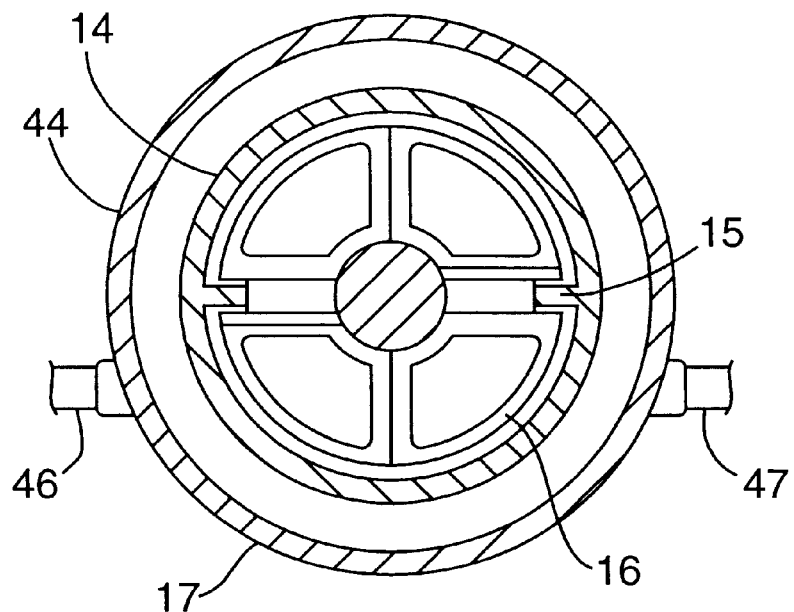
FIG. 5a and FIG. 5b are a plane view and a perspective view or the scrubber member shown at FIG.4.

The exhaust tube 14 has three guide-rails formed radially in the inner surface thereof and a flange 19 formed on the upper portion thereof (sec FIG. 5a). The upper plate 18 is fastened to the flange 19 by a plurality of bolts 35, and a gap between the flange 19 and the upper part 18 is sealed with a sealing member 37 such as a gasket 37 to prevent the gas from leaking outward through the gap while the gas is passing through the exhaust tube 14.

Figure 6:
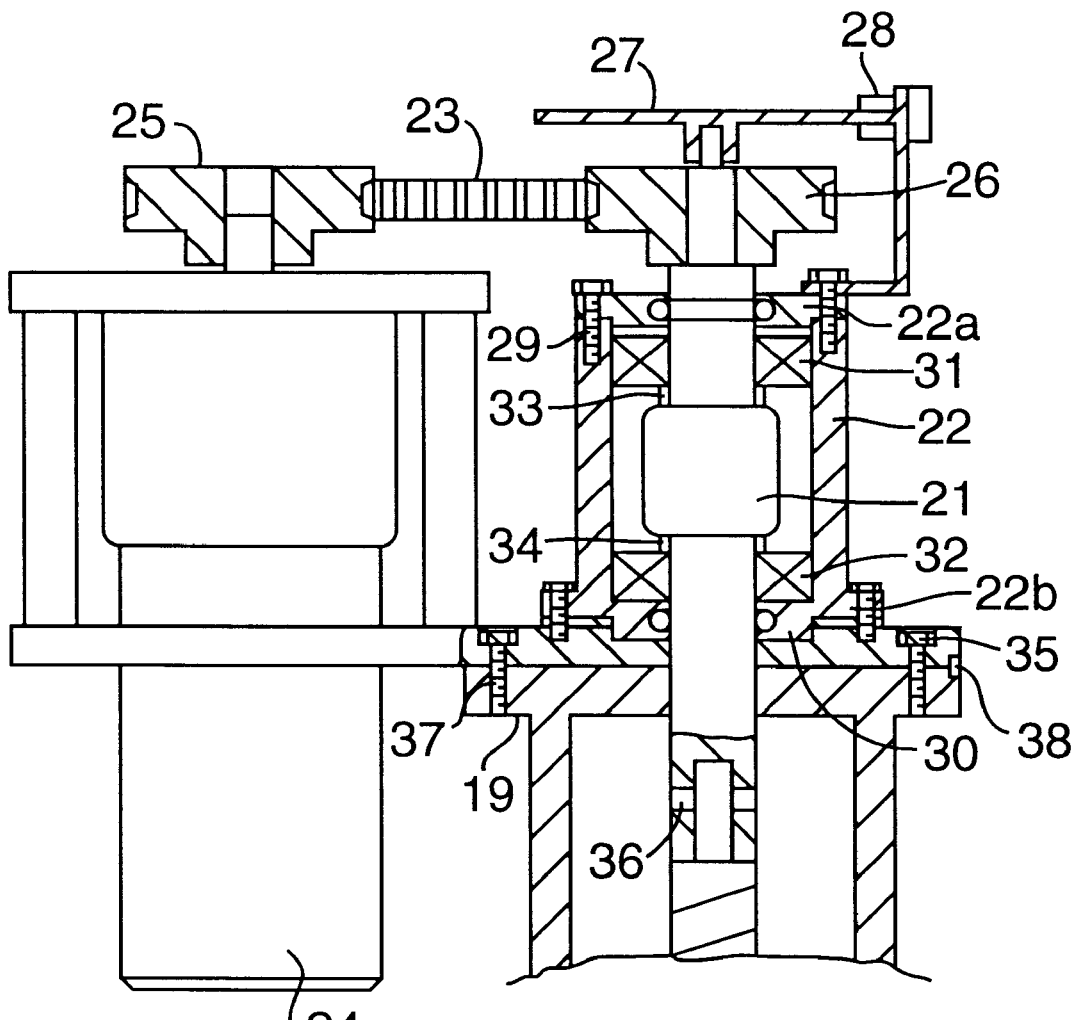
FIG. 6 is a sectional view to illustrate a structure for transferring power from a motor to the screw bar used in the burner or the adsorption device.

A first screw bar 17 is provided in the inside of the exhaust tube 14 as illustrated in FIG. 3 and FIG. 4. The first screw bar 17 is connected to a connecting rod 21 through the holes formed in the center of the upper flange 19 and an upper plate 18, respectively. As illustrated in FIG. 6, an opening is formed at the lower portion of the connecting rod 21, and the first screw bar 17 has a portion projected at the upper portion thereof. The portion is inserted to the opening of the connecting rod 21 and then a pin 36 or other fastener is inserted into holes which are formed transversely at the opening and the projecting portion, respectively, whereby two members can be engaged together.

The connecting rod 21 contains a housing 22 of a first driving part or first driver 91, which is mounted on the upper plate 18, a pulley or gear 26 which is connected to a motor 24 through a timing belt 23 is mounted on the upper part of the connecting rod 21. As illustrated in FIG. 6, an upper and a lower parts of the connecting rod 21 are rotatably supported by a pair of radial bearings 31, 32 in radial direction and also by a pair of trust bearings 33, 34 in axial direction, the bearings being provided in the housing 22. To seal both upper and lower portions 22a,b of the housing 22 in which the connecting rod 21 passes through, O-rings 29, 30 are placed in both upper and lower portions 22a,b of the housing 22. Moreover, to prevent a leakage of the gas through a gap between the housing 22 and the upper plate 18, a gasket 38 is placed between upper plate 18 and lower part 22b of the housing 22.

Therefore, when the motor 24 of the driving part 91 is driven, a gear or pulley 25 mounted on a shaft of the motor rotates, and the rotating force of the gear or pulley 25 is transfer through the belt 23 to a gear or pully 26 which is attached to the connecting rod 21. By the virtue of transfer of the rotating force, when the connecting rod 21 is rotated with a driving of the motor 24, the first screw bar 17 connected to the connecting rod 21 is rotated in the direction coincided with the rotational direction movement of the motor 24. The motor 24 is driven based on a program inputted to a control system and the rotation amount thereof is measured by the sensor 28 which senses a rotation amount of the rotation plate 27 attached to the upper end of the gear or pulley 26. The rotation sensor 28 of the motor 24 also controls distance and direction of the movement of a particle eliminator 16 that moves along the first screw bar 17 with the rotation thereof.

Figure 5B:
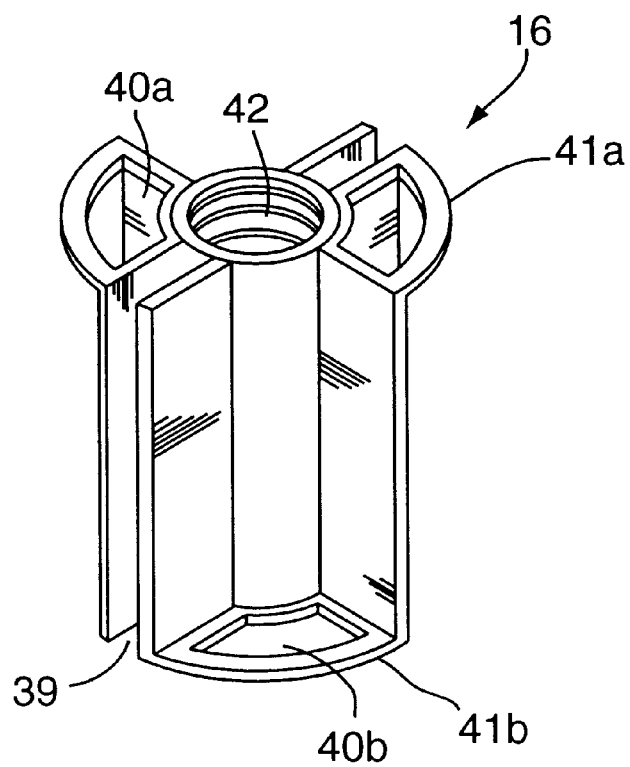

As illustrated in FIG. 5a and FIG. 5b, the particle eliminator 16 is preferably made of stainless steel and is engaged to the first screw bar 17. When the first screw bar 17 is rotated as a result of the driving of the motor 24, the particle eliminator 16 then moves up and down along a spiral line of the first screw bar 17. At this time, the particle eliminator 16 can be prevented from a rotating by engaged with the guide rails 15 formed at the inner surface of the exhaust tube 14, as shown in FIG. 5a. The particle eliminator 16 maintains a certain gap between the inner surface of the exhaust tube 14 and an outer surface thereof.

While a gas discharged from the burning case 4 passes through the exhaust tube 14, some of the unburned harmful components of the gas are adsorbed to the inner surface of the exhaust tube 14 and the guide rail 15. The harmful components of the gas adsorbed by the exhaust tube 14 and the guide rail 15 are converted to solid particles through cooling. When the amount of the adsorbed solid particles are greater than the gap between the inner surface of the exhaust tube 14 and the particle eliminator 16, then the particle eliminator 16 is moved along the guide rails 15 by the first screw bar 17 which is rotated by the driving of the motor 24. As described above the motor 24 is driven on a fixed timetable. Therefore the solid particles, which are adsorbed to the inner surface of the exhaust tube 14, are eliminated from the exhaust tube 14 and the guide rail 15 by the up and down movement of the particle eliminator 16.

Referring to FIG. 5b, the particle eliminator 16 has a slit 39 that is engaged with the guide rail 15, an upper and a lower plates 41 a,b in which gas passage holes 40a,b are formed respectively, and the threaded hole 42 formed at the center portion thereof to which the first screw bar 17 is engaged. As described above, some components of the gas are adsorbed to the inner surface of the exhaust tube 14 and the guide rail 15 while the gas passing through the exhaust tube 14, and other components of the gas are flowed through the gas holes 40a,b of the particle eliminator 16 to the connecting tube 20 which is attached to the exhaust tube 14, then the gas is exhausted to the gas discharge tube 55 or the adsorbent device 2.

As stated above, when the particle eliminator 16 moves as a result of the rotation of the first screw bar 17 along the guide rail 15, the moving distance and direction of the particle eliminator 16 are depended on the rotation amount and direction of the rotation of the motor 24 which drives the first screw bar 17. The rotational direction of the motor 24 is changed by signal of the sensor that measures a rotational amount of the motor 24 when completion the movement of the particle eliminator 16 along the guide rail 15 from the top to bottom or vice versa. This rotational amount of the motor 24 is determined by the distance traveled by the particle eliminator 16 driven by the motor 24.

The gas coming from the burning chamber 5 to the exhaust tube 14 has the temperature of about 100° C. to 150° C. To enhance the efficiency of the adsorption of the harmful components of the gas that are in solid state, it is desirable to cool the temperature of the gas discharged from the exhaust tube 14 to about 50° C.

Therefore, in order to cool the temperature of the gas discharged from the exhaust tube 14, the gas scrubber in accordance with the present invention is equipped with a cooling device. As described in FIG. 2, this cooling device 3 includes a first cooling tube 43 in which a cooling water is supplied from a water supply pipe 45 for cooling the gas that runs from the gas intake tube 13 to the burning case 4, a second cooling tube 44, which is connected to the first cooling tube 43 through a pipe 46, is attached to the outside of the exhaust tube 14 for cooling the gas passing through the exhaust tube 14, a third cooling tube 50, which is connected to the second cooling tube 44 through other pipe 47, is attached to the outside of the first connecting pipe 51 for cooling the gas passing through the first connecting pipe 51, and a water discharging pipe 49 attached to the third cooling tube 50 for discharging the cooling water therefrom.

The cooling water is supplied to the first cooling tube 43 through the water supply pipe 45 with certain pressure to cool the gas that passes through the gas intake tube 13, then flows to the second cooling tube 44 through the pipe 46. The gas is heated up to approximately 100° C. to 150° C. in the burning chamber 12. The heated gas is cooled down to approximately 50° C. by being heat exchanged with the cooling water that was supplied to the second cooling tube 44.

Therefore, the gas that has been heated in the burner 1 is quickly cooled while passing through the exhaust tube 14. By this cooling process, there can be high increase in the adsorbing speed of the harmful components to the internal surface of the exhaust tube 14, in the form of the solid state.

On the other hand, as illustrated in FIG. 2, the water supply pipe 45 is connected to the lower of the first cooling tube 43 which is provided in the outside of the inlet 13, and the pipe 46 is extended from the upper of the first cooling tube 43 to the lower of the second cooling tube 44 which is placed in outside of the exhaust tube 14. As described above, because of the water supply pipe 45 is connected to the lower part of the first cooling tube 43, and also the pipe 46 through which the cooling water is drained from the first cooling tube 43 is connected to the upper of the first cooling tube 43, the cooling water forms a swirl in the first cooling tube 43 when the cooling water flows on the outside surface of the exhaust tube 14 as a result of certain amount of pressure applied by the water supply pipe 45. By the virtue of same process, the cooling water also forms a swirl in the second cooling tube 44.

Formation of the swirl in the second cooling tube 44 enhances the cooling efficiency of the gas that flows through the exhaust tube 14, and increase the efficiency of the adsorption of the harmful components to the inner surface of the outlet 14. The cooling water used to cool the gas passing through the exhaust tube 14 flows through the other pipe 47, and the third cooling tube 50 that is connected to the first connecting pipe 51 to the waste pipe 49.

Placements of the water supply pipe 45, the pipes 46, 47 and the waste pipe 49 are preferably located accordance with the flow of the cooling water so that supply and drainage of the cooling water is easily done. As shown in the FIG. 2, when viewed from the top, the pipes 46, 47 and the waste pipe 49 are placed in straight line with the water supply pipe 45 which supplies water to the first cooling tube 43. Therefore, the cooling water used in the first, the second, and the third cooling tubes 43, 44, 50 will be quickly drained through the waste pipe 49. As the cooling water is quickly drained through the waste pipe 49, new cooling water is supplied to the first, the second, and the third cooling tubes 43, 44, 50.

As described above, as a result of cooling process in exhaust tube 14, the effectiveness of the adsorbent process in the inner surface of the exhaust tube 14 can be improved.

The gas that has been initially treated by the burner 1 flows through the first connecting pipe 51 or the second connecting pipe 52 which connected to the exhaust tube 14 to the adsorbent device 2 or the gas discharge tube 55, selectively. As shown in the drawing, the burner 1 is connected to the adsorbent device 2 by the first connecting pipe 51, thus the gas of which the flammable and harmful components are purified in the burner 1 is supplied to the adsorbent device 2 through the first connecting pipe 51.

To selectively prevent the gas from flowing from the burner 1 to the gas discharge tube 55, the second valve 54 is provided to the second connecting pipe 52. Moreover, to selectively prevent the gas from flowing into the adsorbent device 2, the first valve 53 is attached to the first connecting pipe 51. When the first valve 53 is opened and the second valve 54 is closed, the gas is allow to flow from the burner 1 to the adsorption device 2. One the other hand, when the first valve 53 is closed and the second valve 54 is opened, the gas flows from the burner 1 to the gas discharge tube 55 through the second connecting pipe 52.

Figure 7:
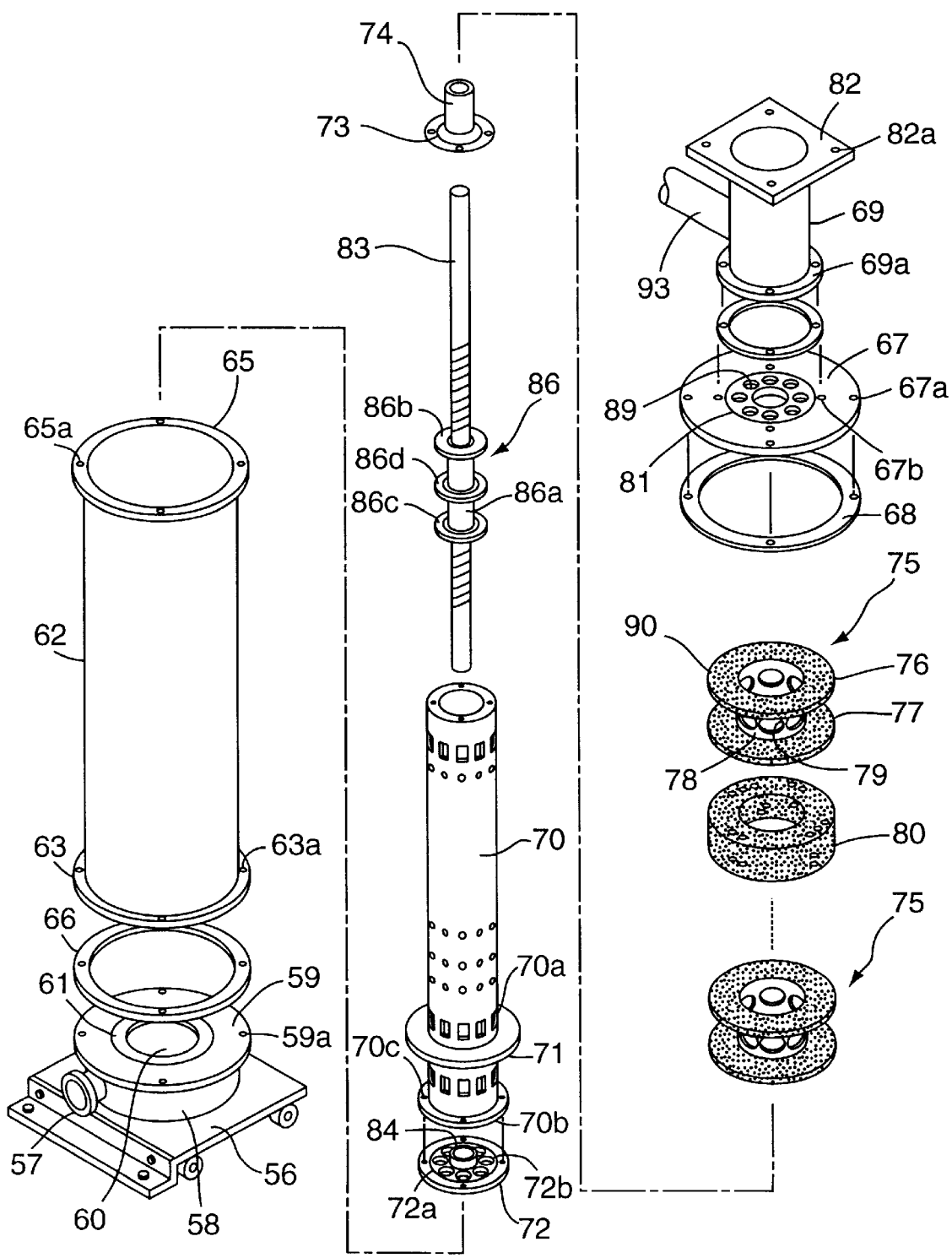
FIG. 7 is an exploded perspective view of the adsorption device of the scrubber shown at FIG. 2.
Figure 10:
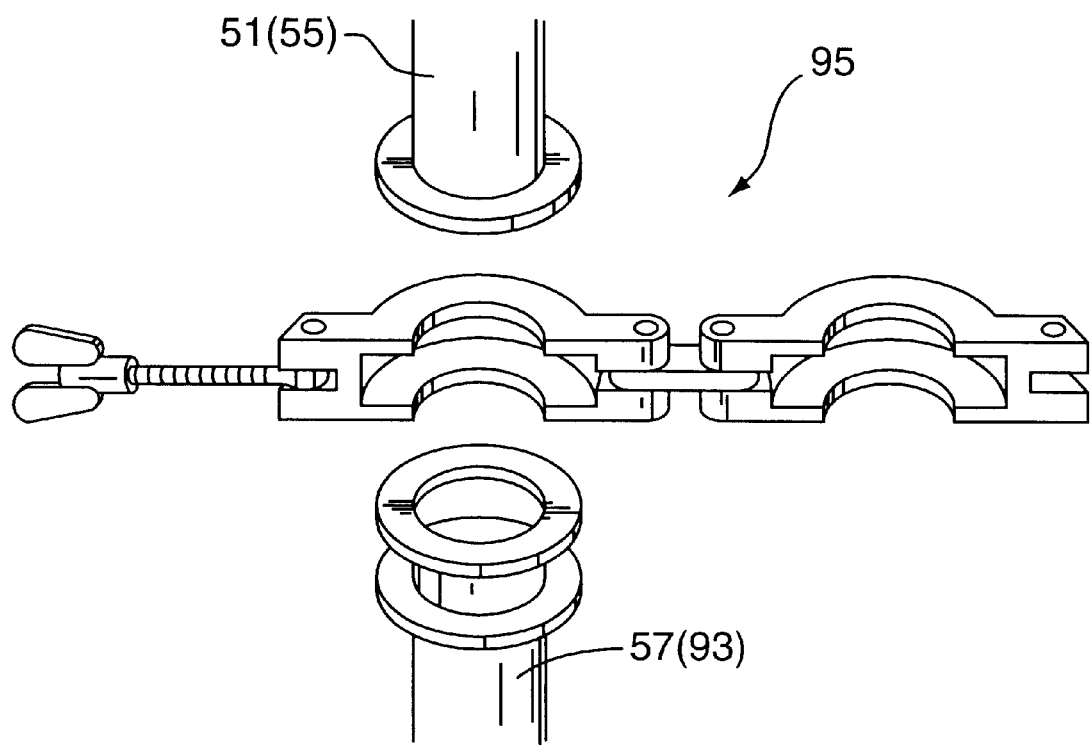
FIG. 10 is a view schematically shown of a clamp used in the burner and the adsorption device.

FIG. 7 illustrates a sectional view of the adsorption device 2 accordance with the present invention. The adsorbent device 2 includes the support stand 56 which is mounted to the floor of the cabinet 3. The support stand 56 supports a lower cylinder 58 that forms the bottom part of the adsorption device 2, and the lower cylinder 58 is provided with a connecting tube 57 at one side thereof that is connected to the first connecting pipe 51. The connecting tube 57 is connected to the first connecting pipe 51 by a clamp 95 as illustrated in detail in FIG. 10, to detach when necessary. A flange 59 is formed on upper part of the lower cylinder 58 and a circular opening 60 is formed in the center of the flange 59. A circular seat 61 is formed around the opening 60 and a plurality of thread holes 59a are provided circumferentially in the flange 59. A cylindrical case 62 is mounted to the top of the lower cylinder 58, the cylindrical case 62 is provided with a flange 63 which has a plurality of thread holes or the thruholes 63a and is mounted to the flange 59 of the lower cylinder 58 by a plurality of bolts fastened to the thread holes or the thruholes 63a. To seal a gap between the flange 59 of the lower cylinder 58 and the cylindrical case 62, a gasket 66 is installed between the flange of lower cylinder 58 and the flange 63 of the cylindrical case.

As illustrated in FIG. 7, also the cylindrical case 62 has an upper flange 65. The upper flange 65 has a plurality of thread holes 65a formed at equal distance circumferentially, and a lid member 67 is mounted to the upper flange 65 by bolting to the thread holes 65a. A gasket 68 is placed between the upper flange 65 and the lid member to seal a gap in between. The lid member 67 has a plurality of the thruholes 67a which are formed at the position corresponding to the thread holes 65a of the upper flange 65, so that bolts are engaged to the thread hole 65a of the upper flange 65 passing through the thruholes 67a, therefore the lid member 63 can be fixed onto the upper flange 65. The lid member 67 has a plurality of thread holes 67b which are placed in an equal interval on the interior of the thruhole 67a, and an opening 81 having a prescribed diameter which is placed in the center thereof. A plurality of gas passage holes 89 is formed around the opening 81 of the lid member 67.

In the inside of the cylindrical case 62, a central cylinder 70 is installed, and the central cylinder 70, as illustrated in FIG. 7, is provided with multiple levels of gas passages 70a, a flange 70b formed at lower thereof, and a circular plate 71 provided at above the flange 70b. The circular plate 71 is seated in the seat 61 formed in the flange 59 of the lower cylinder 58 when the central cylinder 70 is installed to the cylindrical case 62. At this time, a lower end of the central cylinder 70 is separated from the floor of lower cylinder 58 by a distance, and the gas passages 70a formed below the circular plate 71 are positioned in inside of the lower cylinder 58.

A lower plate 72 provided with a plurality of gas passing holes 72a is fixed to the lower flange 70b of the central cylinder 70 as a result of thruholes 72b of the lower plate 72 being bolted to the thread hole 70c formed in the flange 70b of the central cylinder 70. A sealing member 73 is mounted to the top of the central cylinder 70. The sealing member 73 has the hollow shaft 74 which is formed in center of the sealing member 73 and extended by a distance upwardly. The hollow shaft 74 is inserted into the opening 81 of the lid member 67 when the sealing member 73 is mounted to a top of the central cylinder 70 and the lid member 67 is mounted to the upper flange 65 of the cylindrical case 62. At this time, the sealing member 73 is not contacted with the lid member 67 such that the gas can be passed through the gas passage holes 89 formed at the lid member 67.

Figure 8:
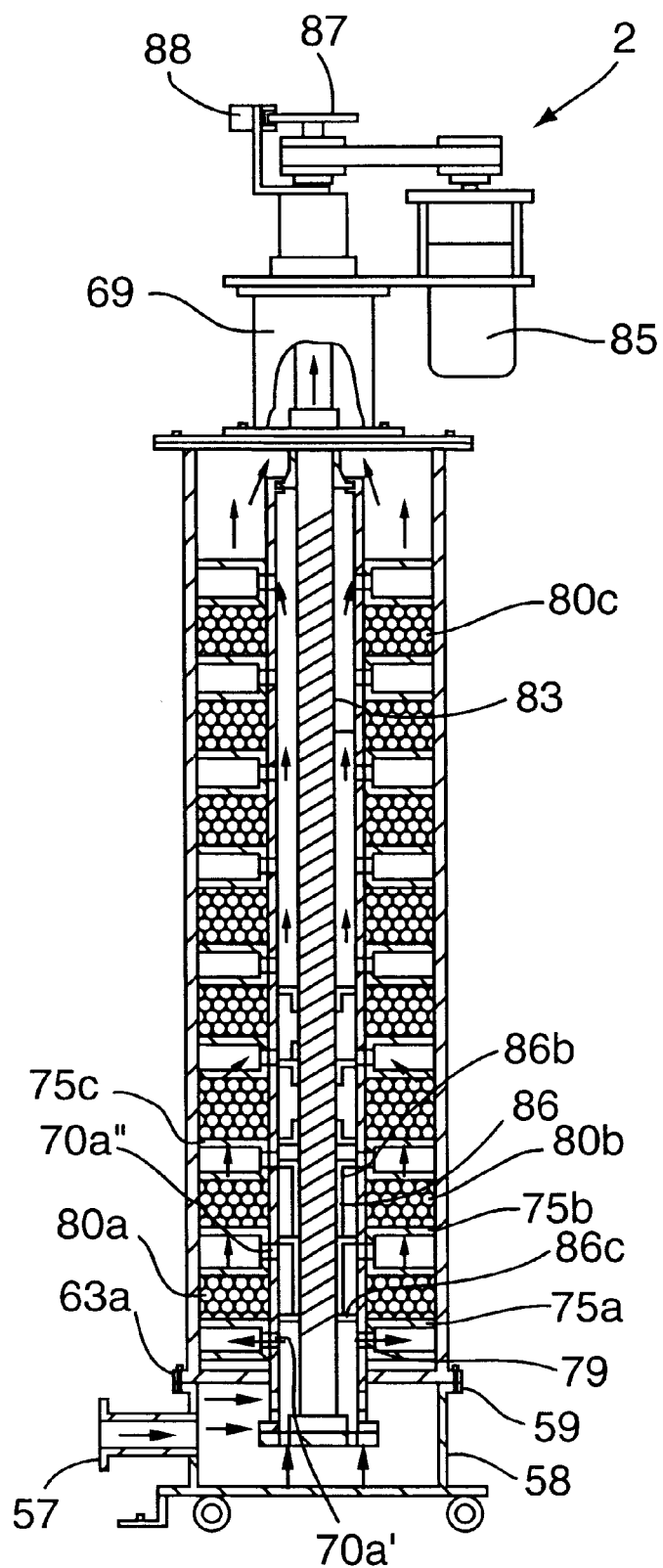
FIG. 8 is a sectional view of the adsorption device.

In the state of that the circular plate 71 is seated on the seat 61 of the flange 59 of the lower cylinder 58, as illustrated in the FIG. 8, a number of cartridges 75 are stacked up around the central cylinder 70, the number of which is at least two less than layers of the gas passages 70a of the central cylinder 70 which are positioned over the flange 59 of the lower cylinder 58. Also, as illustrated in FIG. 8, the cartridges 75 include an upper and a lower plates 76, 77 having an outer diameter which is equal with or slightly greater than an inner diameter of the cylindrical case 62 and is formed with a plurality of holes 90, a cylindrical connector 78 which has a slightly greater diameter than the central cylinder 70 and by which the upper and the lower plates 76, 77 are connected together, and a plurality of holes 79 formed in the connector 78 which are communicated with the gas passages 70a of the central cylinder 70.

As described in FIG. 8, when the cartridges 75 are positioned around the central cylinder 70, the edges of the upper and the lower plates 76, 77 are contacted to the inner surface of the cylindrical case 62. Between adjacent cartridges 75, catalytic adsorbent materials 80 are filled up to remove the remaining harmful components from the gas when the gas passes through them. The catalytic adsorbent materials 80 are made from an agglomeration of particles, each of which is coated with carbon, $Al_2O_3$, or metal oxidation base. The size of the particle is preferably larger than the holes 90 formed on the upper plate 76 and the lower plate 77. The cartridges 75 and the catalytic adsorbent materials 80 are stacked in the cylindrical case 62 around the central cylinder 70 by following manner:

Referring to FIG. 8, the lowest cartridge 75a is placed on the circular plate 71 of the central cylinder 70. At this point, holes 79 that are formed at the cylindrical connector 79 of the lowest cartridge 75a are coincided with the gas passages 70a' located at the lowest level ($1^{st}$ level) of the central cylinder 70. Then, the adsorbent materials 80a is filled over the lowest placed cartridge 75a, and next cartridge 75b is placed to be coincided with a second level of the gas passages 70a'' of the central cylinder 70, and an equal amount of the adsorbent materials 80b is filled on ever the cartridge 75b. This process is repeated until desired number of the cartridge 75 and the adsorbent materials 80 are placed around the central cylinder 70.

As a result, the cartridges 75 and the adsorbent materials 80, as illustrated in FIG. 8, are positioned alternatively in the space between the central cylinder 70 and the cylindrical case 62. When final cartridge 75 is placed around the central cylinder 70, the highest level of the gas passages 70a should be positioned on the top of the final cartridge 75. Accordingly, the central cylinder 70 functions as means for distributing the gas as it distributes gas to each cartridge 75.

If the cartridges 75 and the catalytic adsorbent materials 80 are completely positioned in the space between the central cylinder 70 and the cylindrical case 62, the hollow shaft 74 of the sealing member 73 which is mounted to upper end of the central cylinder 70 is inserted into the opening 81 of the lid member 67, whereby the central cylinder 70 can be firmly positioned within the cylindrical case 62. Thereafter, an upper cylinder 69 is installed on the top of the lid member 67, then an upper cylinder 69 has a flange 69a formed at the bottom of the upper cylinder 69, a rectangular flange 82 placed on the top of the upper cylinder 69, and a connecting tube 93 provided at one side thereof. The flange 69a is provided with a plurality of thruholes formed at locations corresponding to the thread holes 67b of the lid member 67, the rectangular flange 82 is provided with a plurality of thread holes 82a, and the connecting tube 93 is connected detachably to the exhaust pipe 55 by the clamp 95.

A second screw bar 83 is provided in the central cylinder 70, and the lower end of the second screw bar 83 is rotatably by the bearing 84 placed on the lower plate 72 which is fixed onto the central cylinder 70. The upper end of the second screw bar 83 extends upwardly through the sealing member 73 for sealing the upper end of the central cylinder 70. The second screw bar 83 is driven by the second driver 92 which is provided at the upper of the upper cylinder 69. Since the structure for connecting the second driver 92 with the second screw bar 83 is same with that for connecting the first screw bar 17 with the first driver 91, an explanation thereto is omitted to clarify the description herein.

As illustrated in the drawing, a gas distributor 86 is engaged to the second screw bar 83, thus the gas distributor 86 is moved up and down along the second screw bar 83 when a motor 85 of the second driver 92 is driven. The gas distributor 86 is formed of polytetrafluoroetylene, and includes a cylindrical part 86a which is connected to the second screw bar 83, three circular plates 86b,d,c formed at upper, middle, and lower of the cylindrical part 86a, respectively. Each of circular plates 86b,d,c has a diameter in the range that can be tightly contacted with the inner surface of the central cylinder 70, and the circular plates 86b,c,d are also spaced by a distance enough to be located one level of the gas passages 70a in the central cylinder in between.

An initial position of the gas distributor 86 is at the lower circular plate 86c that is flushed with an upper plate 76 of the lowest positioned cartridge 75a, and is moved upward therefrom when the motor 85 is driven, as shown in FIG. 8. A rotation amount of a rotation plate 87 which is placed on top of a connecting rod (not illustrated in the drawing since it has same configuration as the connector 21 in FIG. 5) that connected to the second screw bar 83, whereby a rotation amount of the motor 85 is measured by the sensor 88. The motor 85 is controlled by the control device depended upon the signals of the sensor 88, such that the lower plates 86c of the gas distributor 86 moves upward to a position shown as illustrated two-dot chain line when the motor 71 is driven once.

Figure 9:
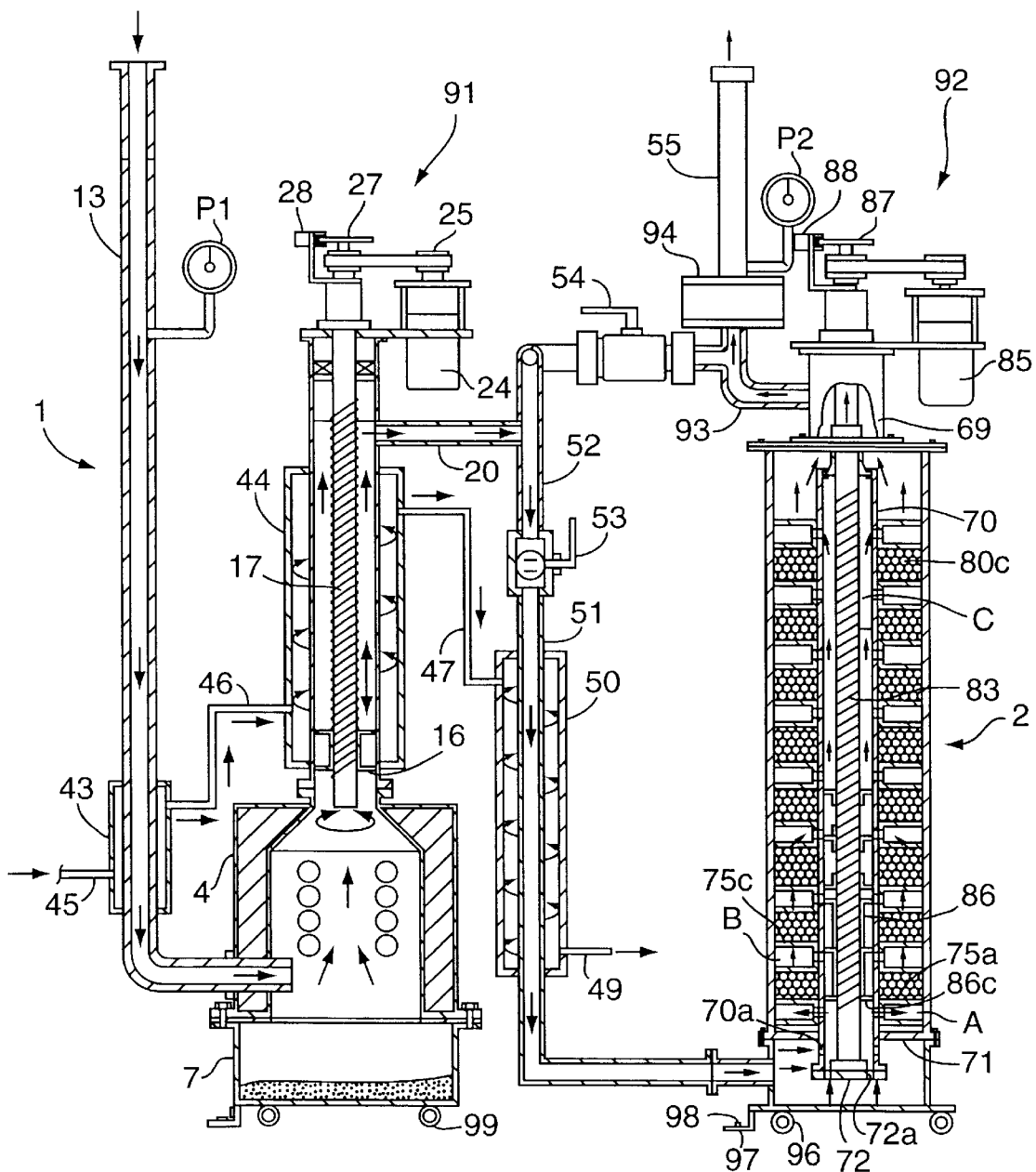
FIG. 9 is a sectional view of the gas scrubber in accordance with the present invention for illustrating in detail of a gas flow.

Referring to FIGS. 8 and 9, an explanation of flow of the gas in the adsorbent device 3 will be described. The gas supplied to the adsorbent device 2 is introduced into the lower cylinder 58 through a connecting tube 57, when the first valve 53 is opened and the second valve 54 is closed, as described above. The gas introduced into the lower cylinder 58 flows into the central cylinder 70 through both the gases passing holes 72a of the lower plate 72 and the gas passages 70a placed below the circular plate 71 of the central cylinder 70. In the central cylinder 70, the gas flows to a space A formed by the cartridge 75a through the gas passages 70a' of the lowest positioned cartridge 75a, since the passage C of the central cylinder 70 is cut off by the lower plate 86c of the gas distributor 86.

The gas flowed into a space A formed by the cartridge 75a permeates into the adsorbent materials 80a through the holes 90 provided at the upper and the lower plate 76, 77 of the cartridge 75a. After the gas passes through the adsorbent materials 80a, 80b, then it flows into a space 13 between the upper and the lower plates 76, 77 of the cartridge 75c positioned above the upper plate 86b of the gas distributor 86. Then the gas introduced into the space 13 flows into the central cylinder 70 passing through the holes 79 of the cartridge 75c.

The gas introduced into the central cylinder 70 is discharged to upper space part of the cylindrical case 62 and passes through the highest gas passages 70a, and then discharged to the upper cylinder 69 after passing through the gas passage holes 89 formed at the lid member 67. The gas discharged to the upper cylinder 69 is discharged to the gas discharge tube 55 that runs through the connecting tube 93 provided in the side of the upper cylinder 69.

While the gas is passing through the catalytic adsorbent materials 80, the harmful components such as $SiH_4$ of the gas reacts physically and chemically with the catalytic adsorbent materials 80 to be removed from the gas by adsorption. Also, while the gas is passing through the central cylinder 70, some of the harmful components of the gas may be adsorbed to the inner surface of the central cylinder 70 and converted to a powder. This powder can be removed from the inner surface of the central cylinder 70 by the plates 86a,b,c of the gas distributor 86 while the gas distributor 86 is moving up and down.

The pressure of gas exhausted through the gas discharge tube 55 can be changed upon the amounts of the harmful components adsorbed to the exhaust tube 14 while passing through the burner 1 and adsorbed to the catalytic adsorbent materials 80 and the central cylinder 70 while passing through the adsorbent device 2. The change of pressure can be measured by the pressure gauge P2 provided in the gas discharge tube 55. The pressure value recorded by the pressure gauge P2 is compared with the pressure value recorded by pressure gauge P1 provided in the gas intake tube 13. Then it is determined whether the motor 85 of the second driver 92 should be driven or not, according to the result of the comparison. Also, when more than 0.3 ppm of the harmful components is detected in the gas discharge tube 55, the motor 85 of the second driver 92 is driven.

Referring to FIG. 9, the method of disposing a gas by using the gas scrubber in accordance with the present invention, which is described above, will be described.

Firstly, the gas produced during the manufacturing of the semiconductor device is introduced into the burning chamber 5 through the gas intake tube 13. When the gas is introduced into the burning chamber 5, gas is heated up to 500° C. to 800° C. by the ceramic heater 11 provided in the burning chamber 5. During passing through the burning chamber 5, the gas is preliminary purified of the flammable components of the gas through the following thermal reactions:

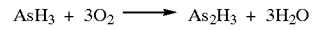
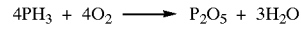
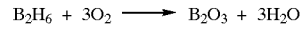
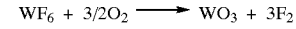

$$SiH_4 + 2O_2 \longrightarrow SiO_2 + 2H_2O$$
$$SiH_2Cl + 3/2 O_2 \longrightarrow SiO_2 + H_2O + Cl_2$$
$$4NH_3 + 3O_2 \longrightarrow 2N_2 + 3H_2O$$
$$AsH_3 + 3O_2 \longrightarrow As_2H_3 + 3H_2O$$
$$4PH_3 + 4O_2 \longrightarrow P_2O_5 + 3H_2O$$
$$B_2H_6 + 3O_2 \longrightarrow B_2O_3 + 3H_2O$$
$$WF_6 + 3/2 O_2 \longrightarrow WO_3 + 3F_2$$

The sludge, which has been created during the burning process in the burning chamber 5, drops to the sludge storage container 7 placed at the bottom of the burning chamber 5 and stored there within. It can be ascertained an amount of the sludge which is stored in the sludge storage container 7 through the window 9 provided in the sludge storage container 7. When the sludge storage container 7 is filled with a certain amount of the sludge, the sludge could be removed through the door that is provided on the side of the sludge storage container 7.

The gas, which is heated at the temperature of 500° C. to 800° C. and the flammable components therein have been removed therefrom, is raised to the exhaust tube 14 located on the top of the burning chamber 5. While passing through the exhaust tube 14, some of untreated harmful components is adsorbed to the inner surface of the exhaust tube 14 and then is converted to solid particles. To remove the solid particles from the inner of the exhaust tube 14, the particle eliminator 16 is moved upward along the first screw bar 17 placed in the exhaust tube 14 by the motor 24 of the first driver 91 which is driven according to the fixed time table. The removed solid particles then drops to the sludge storage container 7.

While the gas that the flammable components therein have been initially treated in the burning chamber 5 is passing through the exhaust tube 14 to the adsorbent device 2, the temperature of the gas is cooled to approximately 50° C. by the cooling device, this cooling process enhances effectiveness of that the unburned harmful components of the gas adsorbed to the inner surface of the exhaust tube 14 and in turn is converted into a solid particle therein.

The gas that was introduced into the adsorbent device 2 passes through a multiple layers of the catalytic adsorbent materials 80 provided in the adsorbent device 2. The catalytic adsorbent materials 80 are made from an agglomeration of particles, each of which is coated carbon, $Al_2O_3$, or metal oxidation base. While the gas is passing through the catalytic adsorbent materials 80, some harmful components of the gas is adsorbed to the particles of the catalytic adsorbent materials 80, and then it can be purified by chemically and physically reacting with the particles in following manner:

$$2SiH_4 + WF_6 \longrightarrow WSi_2 + 6HF + H_2$$
$$SiH_4 \longrightarrow Si + 2H_2$$
$$B_2H_6 \longrightarrow 2B + 3H_2$$

After some harmful components of gas had been adsorbed and purified by the catalytic adsorbent materials 80, the gas flows into the gas discharge tube 55 that runs through the central cylinder 70. The remaining harmful components of the gas are adsorbed to the inner surface of the central cylinder 70 while passing through the central cylinder 70. The harmful components which are adsorbed to the inner surface of the central cylinder 70 are removed from the inter surface of the central cylinder 70 by the gas distributor 86 moving up and down along the central cylinder 70.

The motor 85 that drives the gas distributor 86 is initiated when the measurement of the pressure gauge P2 is lower than the set pressure P, which is a value compared the pressure value recorded by the pressure gauge P2 with the pressure value recorded by the pressure gauge P1 provided in the gas intake tube 13, or more than 0.3 ppm of the harmful components is detected in the gas discharge tube 55. When the motor 85 is driven once, the gas distributor 86 moves upward to a distance where two layers of catalytic adsorbent materials 80 are placed. While the gas passes through the catalytic adsorbent materials 80, the pressure of the gas coming out from the gas discharge tube 55 is lowered due to the blockage of the passages between the particles, which form the catalytic adsorbent materials 80, by the adsorbed harmful components. A filter 94 may be provided at the gas discharge tube 55 to filtrate the materials, such as dusts entrained finally treated gas.

There should be exchanged all the catalytic adsorbent materials 80 in the cylindrical case 62 when the gas distributor 86 is flush with the highest catalytic adsorbent materials 80c, and the pressure of the exhausted gas passing through the highest positioned catalytic adsorbent materials 80c are decreased below the set pressure. In order to replace the catalytic adsorbent materials 80, the clamps 95 which join the first connecting pipe 51 and the connecting pipe 57, and gas discharge tube 55 and the pipe 93, are released, then the adsorbent device 2 is taken from the cabinet 3. Then, the lid member 67 is detached from the cylindrical case 62 to remove the cartridge 75 and the catalytic adsorbent materials 80 from the cylindrical case 62, and replace with new catalytic adsorbent materials 80 between the cartridges 75, then assemble in reverse order of the above stated sequences.

When the cylindrical case 62 is taken from the cabinet 3, two pairs of wheels 96 may be provided to the bottom of the lower cylinder 58 to make process of removing adsorbent device 2 easier. Moreover, when the adsorbent device 2 is fastened to the cabinet 3, two pairs of brackets 97 are placed in the lower cylinder 58 to prevent movement of the adsorbent device 2. Bolts 98 are placed into the thruhole of the fixed bracket 97 to install the adsorbent device 2 to the cabinet 3.

Furthermore, to repair and clean the burner 1, two pairs of wheel 99 may be provided in the bottom of the sludge storage container 7 to make a process of removing the burner 1 easier. When the burner 1 is installed to the cabinet 3, brackets are placed onto the lower cylinder 58 to prevent movement of the burner 1. Same manner with the adsorbent device is used to install the burner 1 to the cabinet 3.

As illustrated in the drawing, if repaired and cleaned burner 1 and cartridge 75, and the adsorbent device 2, which is exchanged with new catalytic adsorbent materials 80, are installed back into the cabinet 3, then the clamp 95 is used to join the burner 1 and the adsorbent device 2, and the gas flows from the burner 1 to the adsorbent device 2 by opening or closing the valves 53, 54.

As stated above, according to the present invention which relates to a gas scrubber and methods of disposing a gas by using the gas scrubber, the gas produced during the manufacturing of the semiconductor device can be effectively purified by burning the flammable components thereof in the burner, then by being adsorbed remaining harmful components thereof in the adsorbent device 2.

Also, the gas scrubber accordance with the present invention is simple in construction, thus the cost for purifying the harmful gas produced during the manufacturing of the semiconductor device is much lower than conventional gas treating method.

Furthermore, since it is simple to remove the clustered handful components powder from the burner and the adsorbent device, the breakage caused by the harmful components powder can be prevented, therefore, the expected life of the gas scrubber accordance with present invention is longer than conventional system.

Furthermore, the gas scrubber accordance with present invention is compact and lighter since both burning and adsorbent device are embodied into one case, therefore, there is advantage of effectively using installation space.

What is claimed is:

1. A gas scrubber for disposing a gas produced during the manufacturing of semiconductor device, comprising;

a cabinet having a door hinged at one side thereof:

a gas intake tube being entered gas which is produced during the manufacturing of semiconductor device, and attached with a first pressure gauge for measuring pressure of the entered gas;

a burner means for burning the gas supplied through the gas intake tube, the burner means being located within the cabinet and connected with the gas intake tube;

an adsorption means for adsorbing components of the gas which have not been burned in the burner means and physically and chemically treating the adsorbed components;

a gas discharge tube for discharging the treated gas, the gas discharge tube being connected to the adsorption device through connecting pipe and attached with a second pressure gauge for measuring pressure of the discharged gas;

means for detachably connecting the burner means to the adsorption means or the gas discharge tube, selectively; and cooling means for cooling the gas heated using cooling water while the gas is moved from the burner means to adsorption means device, the cooling means being located around the burner means and the connecting means, wherein said burner means comprises:

means for burning flammable and harmful components of the gas;

means for adsorbing harmful components unburned in the burning means and making conversion to particle materials; and means for removing the adsorbed materials from the adsorbing means.

2. The gas scrubber as set forth in claim 1, wherein the burning means includes:

a burning case connected with said gas intake tube induction pipe at lower part thereof;

a burning chamber being positioned within said burning case and having ceramic heaters for generating a heat of 500° C. to 800° C. which are provided in inconel tubes parallel placed in multiple levels; and a sludge storage container provided at a lower part of said burning case.

3. The gas scrubber as set forth in claim 2, wherein an insulating material is placed between said burning case and said burning chamber to prevent the heat from emitting the outside of said burning case.

4. The gas scrubber as set forth in claim 2, wherein said sludge storage container has a door provided at one side thereof, and a window formed of a heat resistant glass to ascertain inside of said sludge storage container and provided in said door.

5. The gas scrubber as set forth in claim 1, wherein said adsorbing means is an exhaust tube being connected to an upper portion of the burner means and formed with at least two guide rails at inner surface thereof, such that some unburned harmful components of the gas are adsorbed to an inner surface the exhaust tube while the gas of which flammable and harmful components are burned in the burner means is passing the exhaust tube.

6. The gas scrubber as set forth in claim 5, wherein said connecting means comprises:

a connecting tube being connected one side of the exhaust tube;

a first connecting pipe being connected with the connecting tube to guide the gas to said adsorbent device and provided with a first valve for opening and closing the first connecting pipe;

a second connecting pipe being provided with a second valve for opening and closing the second connecting pipe and branched off said first connecting pipe to guide the gas to the discharge tube, so that the gas is guided to the discharge tube when the first valve is closed and the second valve is opened.

7. The gas scrubber as set forth in claim 5, wherein said means for removing the absorbed material comprises:

a first screw bar positioned within said exhaust tube and rotated by a first motor of a first driver a upper plate for closing of upper end of said exhaust tube;

a particle eliminator being thread-engaged with said connected to first screw bar and moving up-down during the rotating of said first screw bar to thereby eliminate the particles from the inner surface of said exhaust tube; and a connecting rod for transferring a power of said first motor to said first screw bar.

8. The gas scrubber as set forth in claim 7, wherein said first motor is a reversible motor and is driven according to the pre-programmed fixed time so that said screw bar moves said gas particle eliminator up and down alternately according to the pre-programmed fixed time.

9. The gas scrubber as set forth in claim 5, said cooling means includes:

a first cooling tube being provided outside of said gas intake tube;

a second cooling tube being provided outside of said exhaust tube for cooling the gas heated by said burner to a temperature of 50° C.;

a water supply pipe for supplying a cooling water to said first cooling tube, at least one pipe for connecting said cooling tubes together, and a waste pipe attached to said second cooling tube for discharging the used cooling water.

10. The gas scrubber as set forth in claim 8, wherein said water supply pipe, said at least one pipe, and said waste pipe are placed in the straight line when viewed from the top.

11. The gas scrubber as set forth in claim 1, wherein said adsorption means comprises:

a casing being communicated with said burner means and said gas discharge tube;

means for adsorbing harmful and unburned components of the gas and for physically and chemically treating them, said means for absorbing of said absorption means being stacked in multiple layers within said casing; and means for distributing the gas to each layer of said adsorbing means.

12. The gas scrubber as set forth in claim 11, wherein said casing includes a support stands;

a lower cylinder being supported by said support stand and having a connecting tube connected with the first connecting pipe and a flange which is formed at an upper portion thereof and has a circular opening;

a cylindrical case being sealably mounted to said flange of said lower cylinder; and a lid member being sealably mounted at an upper end of said cylindrical case and having an opening and a plurality of gas passage holes formed around said opening.

13. The gas scrubber as set forth in claim 11, wherein said gas distributing means includes:
- a central cylinder having an upper flange, a lower flange, and gas passages arranged in multiple layers corresponding to said adsorbing means, and being located at center of said casing;
- a sealing member having a hollow shaft which is formed in center of said sealing member and is extended by a distance upwardly, and being fixed to the upper flange of said central cylinder;
- a lower plate having a plurality of gas passing holes, and being fixed to the lower flange of said central cylinder;
- a gas distributor being located within said central cylinder and moved upwardly to open gas passages of said central cylinder, sequentially in ascending order from lower gas passages to upper gas passages of said central cylinder.

14. The gas scrubber as set forth in claim 11, wherein said gas adsorbing means comprises a plurality of cartridges being placed around said gas distributing means which is installed at said casing, and a plurality of levels of catalytic adsorbent materials placed in between said cartridges, each of said cartridges has an upper and a lower plates formed with a plurality of holes and having an outer diameter same with the inner surface of said casing, and a cylindrical connector having an inner diameter greater slightly than an outer diameter of said gas distributing means and being provided with a plurality of holes.

15. The gas scrubber as set forth in claim 14, wherein said catalytic adsorbent materials are composed of carbon particles.

16. The gas scrubber as set forth in claim 14, wherein said catalytic adsorbent materials is composed of oxidized alumina particles.

17. The gas scrubber, as set forth in claim 14 wherein said catalytic adsorbent materials is composed of carbon particles coated with oxidized metal base.

18. The gas scrubber as set forth in claim 14, wherein said catalytic adsorbent is composed of oxidized alumina particles coated with oxidized metal base.

19. The gas scrubber, as set forth in claim 13, wherein said gas distributor is threaded-engaged to a second screw bar placed within said central cylinder and is moved upwardly depending upon a rotation of said second screw bar, said second screw bar is connected through a connecting rod to a second motor which is placed at upper part of said casing, so that said second screw bar can be rotated to move said gas distributor upwardly.

20. The gas scrubber as set forth in claim 19, wherein said gas distributor is made up of polytetrafluoroetylene and includes a cylindrical part threaded-engaged to the second screw bar, three circular plates formed at upper, middle, and lower of said cylindrical part, respectively and having a diameter in the range that can be tightly contacted with the inner surface of said central cylinder, and said three circular plates are spaced by a distance enough to be located one level of the gas passages in the central cylinder there between.

21. The gas scrubber as set forth in claim 19, wherein said second motor is reversible motor, said second motor is driven when the measurement of the second pressure gauge provided in said gas discharge tube is lower than the set pressure which is a value compared the pressure value recorded by the second pressure gauge with the pressure value recorded by the first pressure gauge provided in the gas intake tube.

22. The gas scrubber as set forth in claim 19, wherein said second motor is reversible motor, said second motor is driven when more than 0.3 ppm of the harmful components is detected in the gas discharge tube.

\* \* \* \* \*